(12) United States Patent
Yukimasa et al.

(10) Patent No.: US 6,855,756 B2
(45) Date of Patent: Feb. 15, 2005

(54) FLEXIBLE POLYPROPYLENE RESIN

(75) Inventors: Shinichi Yukimasa, Chiba (JP); Masato Kijima, Chiba (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 22 days.

(21) Appl. No.: 10/148,879

(22) PCT Filed: Oct. 19, 2001

(86) PCT No.: PCT/JP01/09195

§ 371 (c)(1),
(2), (4) Date: Jun. 12, 2002

(87) PCT Pub. No.: WO02/32973

PCT Pub. Date: Apr. 25, 2002

(65) Prior Publication Data

US 2003/0055137 A1 Mar. 20, 2003

(30) Foreign Application Priority Data

Oct. 20, 2000 (JP) .................... 2000-320860

(51) Int. Cl.$^7$ ................. C08K 5/51
(52) U.S. Cl. .............. 524/128; 524/581; 524/582; 524/583
(58) Field of Search ............... 524/128, 581, 524/582, 583, 554, 592

(56) References Cited

U.S. PATENT DOCUMENTS

| | | | | |
|---|---|---|---|---|
| 6,156,846 A | * | 12/2000 | Tsuruoka et al. | 525/240 |
| 6,423,782 B1 | | 7/2002 | Yukimasa et al. | 525/191 |
| 6,632,885 B2 | * | 10/2003 | Morizono et al. | 525/191 |

FOREIGN PATENT DOCUMENTS

| | | |
|---|---|---|
| EP | 497590 | 8/1992 |
| JP | 6-116391 | 4/1994 |
| JP | 7-247318 | 9/1995 |
| JP | 8-12713 | 1/1996 |
| JP | 2000-248020 | 9/2000 |

* cited by examiner

*Primary Examiner*—Peter D. Mulcahy
(74) *Attorney, Agent, or Firm*—Oblon, Spivak, McClelland, Maier & Neustadt, P.C.

(57) ABSTRACT

The present invention relates to a soft polypropylene resin having a melt index falling in a specific range, prepared by melting and kneading a substantial propylene homopolymer or a propylene copolymer composition each having specific properties in the presence of a radical-generating agent.

According to the present invention, capable of being provided at a good productivity is a soft polypropylene resin which is useful as an alternative for a polyvinyl chloride resin in the fields of films, sheets, construction materials and the like and which is excellent in fluidity.

20 Claims, No Drawings ic viscosity and therefore are short of fluidity, so that they

FLEXIBLE POLYPROPYLENE RESIN

BACKGROUND OF THE INVENTION

The present invention relates to a soft polypropylene resin, more specifically to a soft polypropylene resin which is useful as an alternative to a polyvinyl chloride resin in the fields of films, sheets, construction materials and the like and which is excellent in fluidity and productivity.

RELATED ART

Soft materials have so far been used in many cases in the fields of films, sheets, construction materials and the like. Soft materials are used for, for example, floor materials such as cushion floors, tiles and carpets, and polyvinyl chloride resins have so far widely been used for the soft materials. However, the polyvinyl chloride resins generate harmful chlorine and hydrogen chloride in burning, and in addition thereto, they are likely to generate dioxins to provide environmental problems. Accordingly, materials substituted for polyvinyl chloride resins and composite materials using them are desired to be developed.

Known as such materials are, for example, soft polypropylene resins. However, there have been the problems that the production processes thereof are restricted or polymers which can be produced are restricted depending on the properties of the polymers in producing these soft polypropylene resins.

In general, used as a production process for a soft polypropylene resin is a process in which propylene is homopolymerized or copolymerized with a small amount of other olefins in a specific catalyst system by a single stage polymerization process or a two-stage polymerization process in which a propylene resin is produced in the first stage polymerization in the same manner as described above and in which propylene is then random-copolymerized with other olefins. Such processes are disclosed in, for example, Japanese Patent Application Laid-Open No. 240069/1994 and Japanese Patent Application Laid-Open No. 239935/1994. However, soft polypropylene resins have high intrinsic viscosities and therefore are short of fluidity, so that they do not necessarily have a sufficiently high productivity in molding.

The problems described above can be solved by reducing the molecular weights of the polymers. In general, a method in which a lot of hydrogen is added in polymerization is used as a method for reducing a molecular weight of polyolefins.

However, in such production processes for soft polypropylene resins, liable to be brought about are unfavorable matters such as formation of lump of polymers, clogging of pipelines and sticking of polymers to a reactor, and long-term continuous operation becomes impossible in some cases. Thus, there has been a problem on operation of an apparatus, that is, productivity.

On the other hand, a method for modifying a propylene polymer having a high molecular weight by melting and kneading it in the presence of a radical-generating agent is known as a method for reducing a molecular weight of a polymer to elevate a fluidity (moldability) thereof. However, known is no method for modifying a soft propylene polymer having a high molecular weight by melting and kneading it in the presence of a radical-generating agent.

Under such circumstances, an object of the present invention is to provide a soft polypropylene resin which is useful as an alternative for a polyvinyl chloride resin in the fields of films, sheets, construction materials and the like and which is excellent in fluidity and productivity.

DISCLOSURE OF THE INVENTION

Intensive researches repeated by the present inventors in order to develop a soft polypropylene resin which is excellent in fluidity and productivity have resulted in finding that the above object can be achieved by a resin having a melt index falling in a specific range which is obtained by melting and kneading a substantial propylene homopolymer having a specific property or a propylene copolymer composition in the presence of a radical-generating agent. The present invention has been completed based on such knowledge.

That is, the present invention provides:

(1) a soft polypropylene resin having a melt index (temperature: 230° C., load: 21.18N) of 1 to 10 g/10 minutes, prepared by melting and kneading in the presence of a radical-generating agent, a propylene resin comprising a substantial propylene homopolymer having a boiling n-heptane-insoluble matter content of 90% by weight or less and a intrinsic viscosity $[\eta]$ of 3 to 6 deciliter/g which is measured at 135° C. in tetralin, and (2) a soft polypropylene resin having a melt index (temperature: 230° C., load: 21.18N) of 1 to 10 g/10 minutes, prepared by melting and kneading in the presence of a radical-generating agent, a propylene resin comprising a propylene copolymer composition comprising 10 to 95% by weight of a homogeneous part comprising a substantial propylene homopolymer and 90 to 5% by weight of a copolymerization part comprising a propylene-ethylene random copolymer, wherein the homogeneous part described above has a boiling n-heptane-insoluble matter content of 90% by weight or less and a intrinsic viscosity $[\eta]$ of 3 to 6 deciliter/g which is measured at 135° C. in tetralin; the copolymerization part described above comprises 10 to 60% by weight of an ethylene unit; and the whole part has a intrinsic viscosity $[\eta]$ of 3 to 6 deciliter/g which is measured at 135° C. in tetralin.

BEST MODE FOR CARRYING OUT THE INVENTION

The present invention shall be explained below in further details.

In the soft polypropylene resin of the present invention, used as the raw material is a propylene resin comprising a substantial propylene homopolymer or a propylene copolymer composition having the following properties.

The substantial propylene homopolymer used as the raw material means a propylene homopolymer or a propylene copolymer comprising 4 mole % or less of other olefin units. In the propylene copolymer described above comprising 4 mole % or less of other olefin units, capable of being given as olefins for comonomers forming the other olefin units are, for example, α-olefins such as ethylene, butene-1, pentene-1, 4-methyl-1-pentene, hexene-1, heptene-1, octene-1, nonene-1 and decene-1. Among them, ethylene is suited. In this propylene copolymer comprising the substantial propylene homopolymer, the boiling n-heptane-insoluble matter content is 90% by weight or less. If this content exceeds 90% by weight, the resin is increased in an elastic modulus and hardened, so that a softened polypropylene resin which is a characteristic of the present invention can not be obtained. On the other hand, if the above insoluble matter content is too small, the above propylene resin is likely to be short of production stability. Accordingly, the preferred boiling n-heptane-insoluble matter content falls in a range of 60 to 90% by weight.

The boiling n-heptane-insoluble matter content described above is a value, which is shown by weight %, showing an extract residue obtained after carrying out extraction for 6 hours in boiling n-heptane by means of a Soxhlet extract tester.

The intrinsic viscosity [η] measured at 135° C. in tetralin falls in a range of 3 to 6 deciliter/g. If this [η] is less than 3 deciliter/g, formation of lump of polymers, clogging of pipelines and sticking of polymers to a reactor are likely to be caused in producing the above propylene resin, so that the production stability is short. On the other hand, it is difficult to produce the resin having a intrinsic viscosity exceeding 6 deciliter/g by a conventional polypropylene production apparatus. Further, when the propylene resin having such a high intrinsic viscosity is molten and kneaded in the presence of a radical-generating agent to produce a polymer having a melt index of 1 to 10 g/10 minutes, it is highly possible that fish eyes are produced on a molded article produced from such polymer.

Accordingly, the preferred intrinsic viscosity [η] falls in a range of 3 to 5 deciliter/g.

On the other hand, the propylene resin comprising the propylene copolymer composition used as the raw material comprises 10 to 95% by weight of a homogeneous part comprising a substantial propylene homopolymer and 90 to 5% by weight of a copolymerization part comprising a propylene-ethylene random copolymer. If the copolymerization part has a content of exceeding 90% by weight, the soft polypropylene resin having a satisfactory performance is less liable to be obtained, and if it is less than 5% by weight, the above resin is not substantially different from the propylene homopolymer described above. In a preferred content proportion of the homogeneous part and the copolymerization part, the homogeneous part falls in a range of 30 to 95% by weight, and the copolymerization part falls in a range of 70 to 5% by weight.

In this propylene copolymer composition, the homogeneous part comprising the substantial propylene homopolymer described above has, because of the same reasons as those for the substantial propylene homopolymer described above, a boiling n-heptane-insoluble matter content falling in a range of 90% by weight or less, preferably 60 to 90% by weight and a intrinsic viscosity [η] falling in a range of 3 to 6 deciliter/g, preferably 3 to 5 deciliter/g which is measured at 135° C. in tetralin.

Further, the copolymerization part described above comprising a propylene-ethylene random copolymer comprises an ethylene unit falling in a range of 10 to 60% by weight. If this ethylene unit content is less than 10% by weight, the resulting soft polypropylene resin is reduced in an impact resistance, and if it exceeds 60% by weight, the resin is deteriorated in properties because of stickiness and an increase in an adhesive component, so that it shall be difficult to continuously produce the resin. Because of these reasons, the ethylene unit in the above copolymerization part falls preferably in a range of 20 to 50% by weight.

This propylene resin comprising the propylene copolymer composition has a intrinsic viscosity [η] of 3 to 6 deciliter/g which is measured at 135° C. in tetralin. If this [η] is less than 3 deciliter/g, formation of lump of polymers, clogging of pipelines and sticking of polymers to a reactor are likely to be caused in producing the above propylene resin, so that the production stability is short. On the other hand, it is difficult to produce the resin having a intrinsic viscosity exceeding 6 deciliter/g by a conventional polypropylene production apparatus. Further, when the propylene resin having such a high intrinsic viscosity is molten and kneaded in the presence of a radical-generating agent to produce a polymer having a melt index of 1 to 10 g/10 minutes, it is highly possible that fish eyes are produced on a molded article produced from such polymer.

Accordingly, the preferred intrinsic viscosity [η] falls in a range of 3 to 5 deciliter/g.

This propylene resin comprising the propylene copolymer composition may be a so-called propylene block copolymer or may be a mixture of a substantial propylene homopolymer and a propylene-ethylene random copolymer.

The substantial propylene homopolymer having the properties described above which is used as a raw material for the soft polypropylene resin of the present invention can be produced by, for example, a gas phase single stage polymerization process and a slurry single stage polymerization process. Further, the propylene copolymer composition may be produced by, for example, a gas phase multistage polymerization process and a slurry multistage polymerization process or may be prepared by blending the substantial propylene homopolymer and the propylene-ethylene random copolymer which are separately produced.

When it is produced by, for example, a polymerization process, propylene may be homopolymerized or may be copolymerized with ethylene in the presence of a catalyst system comprising:

(W) a solid component composed of (i) a solid catalyst component comprising magnesium, titanium, a halogen atom and an electron donating substance and
(ii) a crystalline polyolefin used if necessary,
(X) an organic aluminum compound,
(Y) an alkoxy group-containing aromatic compound represented by Formula (I):

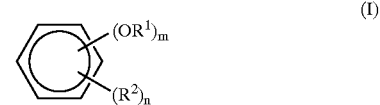

wherein $R^1$ represents an alkyl group having 1 to 20 carbon atoms; $R^2$ represents a hydrocarbon group having 1 to 10 carbon atoms, a hydroxyl group or a nitro group; m represents an integer of 1 to 6; and n represents 0 or an integer of 1 to (6-m), and (Z) an electron donating compound used if necessary.

The solid component (W) described above is composed of the solid catalyst component of the component (i) comprising magnesium, titanium, a halogen atom and an electron donating substance and the crystalline polyolefin of the component (ii) used if necessary. The solid catalyst component of the above component (i) comprises magnesium, titanium, a halogen atom and an electron donating substance as essential components and can be prepared by bringing a magnesium compound, a titanium compound and an electron donating substance into contact. In this case, a halogen atom is contained in the magnesium compound and/or the titanium compound in the form of a halide.

Capable of being given as the above magnesium compound are, for example, magnesium dihalides such as magnesium chloride, magnesium oxide, magnesium hydroxide, hydrotalcite, carboxylates of magnesium, alkoxymagnesiums such as diethoxymagnesium, allyloxymagnesium, alkoxymagnesium halides, allyloxymagnesium halides, alkylmagnesiums such as ethylbutylmagnesium, alkylmagnesium halides and reaction products of organic magnesium compounds with electron donating substances, halosilanes, alkoxysilanes, silanols and aluminum compounds. Among them, magnesium halides, alkoxymagnesiums, alkylmagnesiums and alkylmagnesium halides are suited. These magnesium compounds may be used alone or in combination of two or more kinds thereof.

Further, reaction products of metallic magnesium with halogens and alcohols can be used as the magnesium compound. In this case, metallic magnesium used shall not specifically be restricted, and metallic magnesium having an optional particle diameter, for example, granular, ribbon-shaped and powdery magnesiums can be used. The surface condition of metallic magnesium shall not specifically be restricted as well, but magnesium on which a coat of magnesium oxide is not formed is preferred.

Further, optional ones can be used as the alcohol, but lower alcohols having 1 to 6 carbon atoms are preferably used. In particular, ethanol is suited since it provides the solid catalyst component which markedly elevates revelation of the catalyst performance. A purity and a moisture content of the alcohol shall not be restricted, but if alcohols having a large moisture content are used, magnesium hydroxide is formed on a metallic magnesium surface, and therefore alcohols having a moisture content of 1% by weight or less, particularly 2000 ppm or less are preferably used. The less the moisture content, the more advantageous.

The kind of halogen and/or the halogen-containing compound shall not be restricted, and any compounds can be used as the halogen-containing compound as long as it contains a halogen atom in a molecule thereof. In this case, the kind of the halogen atom shall not specifically be restricted, and chlorine, bromine or iodine, particularly iodine is suitably used. Among the halogen-containing compounds, halogen-containing metal compounds are particularly preferred. A state, a form and a particle size thereof shall not specifically be restricted, and optional compounds can be used. For example, they can be used in the form of a solution prepared by dissolving them in an alcohol solvent (for example, ethanol).

A use amount of the alcohol is selected in a range of 2 to 100 moles, preferably 5 to 50 moles per mole of metallic magnesium. Too large alcohol amount tends to be less liable to provide the magnesium compound having a good morphology, and if the amount is small, it is likely that the alcohol is not smoothly reacted with metallic magnesium.

The halogen and/or the halogen-containing compound is used in a proportion of 0.0001 mole or more, preferably 0.0005 mole or more and more preferably 0.001 mole or more per mole of metallic magnesium in terms of a halogen atom. If it is less than 0.0001 mole, the titanium-supported amount, the catalyst activity, the stereoregularity and a morphology of the resulting polymer are reduced when the magnesium compound obtained is used without crushing, and crushing treating is indispensable. Accordingly, it is not preferred. Further, suitable selection of a use amount of the halogen and/or the halogen-containing compound makes it possible to optionally control a particle diameter of the resulting magnesium compound.

Metallic magnesium can be reacted with the alcohol, the halogen and/or the halogen-containing compound by a publicly known method. It is, for example, a method in which metallic magnesium is reacted with the alcohol, the halogen and/or the halogen-containing compound under refluxing for usually about 20 to 30 hours until hydrogen gas is not observed to be generated to obtain the desired magnesium compound. To be specific, when iodine is used as halogen, included are, for example, a method in which metallic magnesium and solid iodine are added to alcohol and the mixture is then refluxed by heating, a method in which metallic magnesium and an alcohol solution of solid iodine is dropwise added to alcohol and the mixture is then refluxed by heating and a method in which an alcohol solution of iodine is dropwise added to an alcohol solution containing metallic magnesium while heating. Any method is preferably carried out under an inert gas atmosphere of nitrogen gas or argon gas, if necessary, using an inactive organic solvent (for example, saturated hydrocarbons such as n-hexane). The respective whole amounts of metallic magnesium, the alcohol, the halogen and/or the halogen-containing compound do not have to be added to a reactor from the beginning, and they may be added in a divisional manner. Particularly preferred is a method in which the whole amount of the alcohol is added from the beginning and then metallic magnesium is added thereto in a divisional manner of several times.

Such method can prevent hydrogen gas from being temporarily produced in a large quantity and therefore is preferred very much from a safety point of view. Also, the above method makes it possible to make the reactor small-sized. Further, scattering and accompanying of the alcohol, the halogen and/or the halogen-containing compound caused by hydrogen gas which is temporarily produced in a large quantity can be prevented as well. The divisional frequency can be determined taking a size of the reactor into consideration, and usually 5 to 10 times is suited considering complexity of the operation. It is a matter of course that the reaction itself may be either a batch system or a continuous system. Further, it is possible as a modified method to repeat an operation in which a small amount of metallic magnesium is first added to the alcohol added in the whole amount from the beginning and products formed by the reaction are removed by separating into another bath and in which a small amount of metallic magnesium is then added again.

When the magnesium compound thus obtained is used for preparing the subsequent solid catalyst component, it may be dried and then used or may be washed with an inactive solvent such as heptane after filtering and then used. In any case, the magnesium compound obtained is excellent in a particle form and has a narrow particle diameter distribution, and therefore it can be used in the subsequent step without carrying out a crushing operation or a classification operation for putting a particle diameter distribution into order.

Further, a catalyst and a polymer produced using such magnesium compound are excellent as well in a particle form and a particle diameter distribution. This reduces problems which are likely to be caused in polymerization, such as formation of lump of polymers, clogging of pipelines and sticking of polymers to a reactor. Further, provided is the advantage that handling of the polymer powder is facilitated in the subsequent melting and kneading treatment.

The above titanium compound includes, for example, tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium and tetraphenoxytitanium; titanium tetrahalides such as titanium tetrachloride, titanium tetrabromide and titanium tetraiodide; monoalkoxytitanium trihalides such as methoxytitanium trichloride, ethoxytitanium trichloride, propoxytitanium trichloride, n-butoxytitanium trichloride and ethoxytitanium tribromide; dialkoxytitanium dihalides such as dimethoxytitanium dichloride, diethoxytitanium dichloride, dipropoxytitanium dichloride, di-n-butoxytitanium dichloride and diethoxytitanium dibromide; and trialkoxytitanium monohalides such as trimethoxytitanium chloride, triethoxytitanium chloride, tripropoxytitanium chloride and tri-n-butoxytitanium chloride. Among them, suited is the titanium compounds having a higher halogen content, particularly titanium tetrachloride. These titanium compounds may be used alone or in combination of two or more kinds thereof.

Compounds given later as the examples of the electron donating compound of the component (Z) can be used as the electron donating substance.

The above solid catalyst component (i) can be prepared by publicly known methods (Japanese Patent Application Laid-Open No. 43094/1978, Japanese Patent Application Laid-Open No. 135102/1980, Japanese Patent Application Laid-Open No. 135103/1980, Japanese Patent Application Laid-Open No. 18606/1981, Japanese Patent Application Laid-Open No. 166205/1981, Japanese Patent Application Laid-Open No. 63309/1982, Japanese Patent Application Laid-Open No. 190004/1982, Japanese Patent Application Laid-Open No. 300407/1982 and Japanese Patent Application Laid-Open No. 47003/1983).

The solid catalyst component (i) thus prepared has usually a composition in which a magnesium/titanium mole ratio falls in a range of 2 to 100 and a halogen/titanium mole ratio falls in a range of 5 to 100 and in which an electron donating substance/titanium mole ratio falls in a range of 0.1 to 10.

The crystalline polyolefin of the component (ii) used, if necessary, in preparing the solid component (W) includes, for example, crystalline polyolefins obtained from $\alpha$-olefins having 2 to 10 carbon atoms, such as polyethylene, polypropylene, polybutene and poly-4-methyl-1-pentene. These crystalline polyolefins can be obtained by using (1) a method (pre-polymerization method) in which olefin is pre-polymerized in the presence of a combination of the solid catalyst component (i), the organic aluminum compound and the electron donating compound used if necessary each described above, (2) a method (dispersion method) in which the solid catalyst component (i), the organic aluminum compound and the electron donating compound (melting point: 100° C. or higher) used if necessary each described above are dispersed in crystalline powder of crystalline polyethylene and polypropylene in which particle diameters are put into order and (3) a method in which the method (1) described above is combined with the method (2). Among them, preferred is the pre-polymerization method in which the catalyst component does not peel off from a polyolefin surface.

In the pre-polymerization method (1) described above, an aluminum/titanium mole ratio is selected in a range of usually 0.1 to 100, preferably 0.5 to 5. An electron donating substance/titanium mole ratio falls in a range of 0 to 50, preferably 0.1 to 2.

Preferred as the pre-polymerization method (1) described above is a method using the solid catalyst component, the organic aluminum compound and the electron donating compound which is a stereoregularity-improving agent, for example, an organic silicon compound among the components (Z) described later, particularly alkylalkoxysilane and arylalkoxysilane.

The pre-polymerization temperature falls preferably in a range of 1 to 100° C., particularly preferably a room temperature to 50° C. and further preferably 35 to 40° C. The addition effects of the component (Z) and the component (Y) described later which are suitably added in polymerization in the present invention are elevated by employing such pre-polymerization temperature.

To be specific, it is facilitated to control a boiling n-heptane-insoluble matter content and a intrinsic viscosity of the propylene resin before melting and kneading in the presence of the radical-generating agent. Similarly, it is facilitated to control a boiling n-heptane-insoluble matter content and a intrinsic viscosity of the homogeneous part in the propylene resin before melting and kneading in the presence of the radical-generating agent. This makes it easy to control a tensile elastic modulus and a Shore hardness of the soft polypropylene resin of the present invention. The pre-polymerization pressure is preferably an atmospheric pressure to about 5 MPaG.

A proportion of the solid catalyst component (i) to the crystalline polyolefin (ii) in the solid component (W) is selected so that a weight ratio of the component (ii) to the component (i) falls in a range of usually 0.33 to 200, preferably 0.10 to 50.

Next, a compound represented by Formula (II) can be given as the organic aluminum compound used as the component (X):

$$AlR^3{}_pX_{3-p} \tag{II}$$

wherein $R^3$ represents an alkyl group having 1 to 20 carbon atoms or an aryl group having 6 to 20 carbon atoms; X represents a halogen atom; and p represents a number of 1 to 3. Capable of being suitably used are, for example, trialkylaluminums such as triethylaluminum, triisopropylaluminum, triisobutylaluminum and trioctylaluminum, dialkylaluminum monohalides such as diethylaluminum monochloride, diisopropylaluminum monochloride, diisobutylaluminum monochloride and dioctylaluminum monochloride and alkylaluminum sesquihalides such as ethylaluminum sesquichloride. These aluminum compounds may be used alone or in combination of two or more kinds thereof.

In the foregoing, $R^3$ in Formula (II) is particularly preferably an alkyl group having 3 to 8 carbon atoms. Capable of being given as such compound are the compounds in which an alkyl group has 3 to 8 carbon atoms in the organic aluminum compounds described above.

Used as the component (Y) in the catalyst system suitably used for producing the soft polypropylene resin of the present invention is the alkoxy group-containing aromatic compound represented by Formula (I):

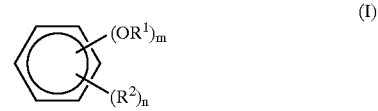

wherein $R^1$ represents an alkyl group having 1 to 20 carbon atoms; $R^2$ represents a hydrocarbon group having 1 to 10 carbon atoms, a hydroxyl group or a nitro group; m represents an integer of 1 to 6; n represents 0 or an integer of 1 to (6-m).

The specific examples of this alkoxy group-containing aromatic compound include monoalkoxy compounds such as m-methoxytoluene, o-methoxyphenol, m-methoxyphenol, 2-methoxy-4-methylphenol, vinylanisole, p-(1-propenyl)anisole, p-allylanisole, 1,3-bis (p-methoxyphenyl)-1-pentene, 5-allyl-2-methoxyphenol, 4-hydroxy-3-methoxybenzyl alcohol, methoxybenzyl alcohol, nitroanisole and nitrophenetole; dialkoxy compounds such as o-dimethoxybenzene, m-dimethoxybenzene, p-dimethoxybenzene, 3,4-dimethoxytoluene, 2,6-dimethoxyphenol and 1-allyl-3,4-dimethoxybenzene; and trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl) benzene, 1,2,4-trimethoxy-5-(1-propenyl)benzene, 1,2,3-trimethoxybenzene and 1,2,4-trimethoxybenzene. Among them, the dialkoxy compounds and the trialkoxy compounds are suited. These alkoxy group-containing aromatic compounds may be used alone or in combination of two or more kinds thereof.

Further, the electron donating compound is suitably used as the component (Z) for the above catalyst. This electron donating compound is a compound containing oxygen, nitrogen, phosphorus, sulfur and silicon, and to be basic, considered is a compound having a performance for elevating stereoregularity in polymerizing propylene.

Capable of being given as such electron donating compound are, for example, organic silicon compounds, esters, thioesters, amines, ketones, nitrites, phosphines, ethers, thioethers, acid anhydrides, acid halides, acid amides, aldehydes, organic acids and azo compounds.

It includes, for example, organic silicon compounds such as diphenyldimethoxysilane, diphenyldiethoxysilane, dibenzyldimethoxysilane, cyclohexylmethyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane and benzyltrimethoxysilane; aromatic dicarboxylic acid esters such as monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate, dimethyl phthalate, diethyl phthalate, dipropyl phthalate, dibutyl phthalate, diisobutyl phthalate, diamyl phthalate, diisoamyl phthalate, methylethyl phthalate, methylisobutyl phthalate, methylpropyl phthalate, ethylbutyl phthalate, ethylisobutyl phthalate, ethylpropyl phthalate, propylisobutyl phthalate, dimethyl terephthalate, diethyl terephthalate, dipropyl terephthalate, diisobutyl terephthalate, methylethyl terephthalate, methylisobutyl terephthalate, methylpropyl terephthalate, ethylbutyl terephthalate, ethylisobutyl terephthalate, ethylpropyl terephthalate, propylisobutyl terephthalate, dimethyl isophthalate, diethyl isophthalate, dipropyl isophthalate, diisobutyl isophthalate, methylethyl isophthalate, methylisobutyl isophthalate, methylpropyl isophthalate, ethylbutyl isophthalate, ethylisobutyl isophthalate, ethylpropyl isoephthalate and propylisobutyl isophthalate; monoesters such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate and ethyl naphthoate; esters such as γ-butyrolactone, δ-valerolactone, coumarin, phthalide and ethylene carbonate; organic acids such as benzoic acid and p-oxybenzoic acid; acid anhydrides such as succinic anhydride, benzoic anhydride and p-toluic anhydride; ketones such as acetone, methyl ethyl ketone, methyl isobutyl ketone, acetophenone, benzophenone and benzoquinone; aldehydes such as acetoaldehyde, propionaldehyde, octylaldehyde, tolualdehyde, benzaldehyde and naphthylaldehyde; acid halides such as acetyl chloride, acetyl bromide, propionyl chloride, butylyl chloride, isobutylyl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, cyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride and benzene-1,2,4-tricarbonyl trichloride; ethers such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisole, diphenyl ether and ethylene glycol butyl ether; acid amides such as acetic acid amide, benzoic acid amide and toluic acid amide; amines such as tributylamine, N,N'-dimethylpiperazine, tribenzylamine, aniline, pyridine, pyrroline and tetramethylethylenediamine; nitrites such as acetonitrile, benzonitrile and tolunitrile; and azo compounds in which a steric hindrance substituent is bonded to an azo bond, such as 2,2'-azobis(2-methylpropane), 2,2'-azobis(2-ethylpropane) and 2,2'-azobis (2-methylpentane).

Among them, preferred are the organic silicon compounds, the esters, the ketones, the ethers, the thioethers, the acid anhydrides and the acid halides, and particularly suited are the organic silicon compounds such as diphenyldimethoxysilane, cyclohexylmethyldimethoxysilane and phenyltriethyoxysilane, the aromatic dicarboxylic acid diesters such as diethyl phthalate, di-n-butyl phthalate and diisobutyl phthalate and the alkyl esters of aromatic monocarboxylic acids such as benzoic acid, p-methoxybenzoic acid, p-ethoxybenzoic acid and toluic acid. These electron-donating compounds may be used alone or in combination of two or more kinds thereof.

In respect to the use amounts of the respective components in the catalyst system, the solid component (W) is used in such an amount as falling in a range of usually 0.0005 to 1 mole per liter of a reaction volume in terms of a titanium atom. The organic aluminum compound (X) is used in such an amount that a mole ratio of aluminum/titanium atoms is usually 1 to 3000, preferably 40 to 800, and if this amount deviates from the range described above, the catalyst activity is likely to become unsatisfactory. Further, the alkoxy group-containing compound (Y) is used in such a proportion that a mole ratio thereof to a titanium atom contained in the solid component (W) is usually 0.01 to 500, preferably 1 to 300, and if this ratio is less than 0.01, the resulting polymer is likely to be reduced in physical properties. On the other hand, if it exceeds 500, the catalyst activity is likely to become unsatisfactory.

In the present invention, when producing the substantial propylene homopolymer, it can be produced by homopolymerizing propylene or copolymerizing propylene with 4 mole % or less of olefin in the presence of the catalyst system described above by a single-stage polymerization method.

On the other hand, when producing the propylene copolymer composition, it can be produced by a two-stage polymerization method in which a substantial propylene homopolymer is produced in the first stage polymerization in the same manner as described above and in which propylene is then random-copolymerized with ethylene in the second stage polymerization, or as described above, the substantial propylene homopolymer and the propylene-ethylene random copolymer may be separately produced and then blended.

The polymerization method shall not specifically be restricted, and used are slurry polymerization, gas phase polymerization, bulk polymerization, solution polymerization and suspension polymerization.

When the polymerization is carried out by gas phase polymerization, the polymerization pressure is suitably selected in a range of usually 1 to 5 MPa, preferably 2 to 3 MPa, and the polymerization temperature is suitably selected in a range of usually 40 to 90° C., preferably 60 to 75° C. A molecular weight of the polymer can be controlled by a publicly known method, for example, by controlling a hydrogen concentration in a polymerization vessel. The polymerization time is suitably selected in a range of 5 minutes to 10 hours.

In the polymerization, the respective components constituting the catalyst system, that is, the components (W) to (Z) are blended in the prescribed proportion and brought into contact, and then the raw material monomer may be immediately introduced to start polymerization or the mixture is ripened for 0.2 to 3 hours after bringing into contact, and then the raw material monomer may be introduced. Further, these catalyst components can be suspended in an inactive solvent or olefin of the raw material monomer and then fed.

After-treatment after polymerization can be carried out by a conventional method. That is, in a gas phase polymerization method, nitrogen flow may be allowed to pass through a polymer powder discharged from a polymerization vessel after polymerization in order to remove unreacted monomers contained therein. Further, the polymer may be pelletized, if necessary, by means of an extruding machine, and in this case, a small amount of water and alcohol can be added in order to completely deactivate the catalyst. In a bulk polymerization method, unreacted monomers are completely removed from a polymer discharged from a polymerization vessel after polymerization, and then the polymer can be pelletized.

In the present invention, the substantial propylene homopolymer thus obtained or the propylene resin comprising the propylene copolymer composition is molten and kneaded in the presence of the radical-generating agent, whereby obtained is a soft polypropylene resin having a melt index (MI) falling in a range of 1 to 10 g/10 minutes which is measured on the conditions of a temperature of 230° C. and a load of 21.18 N.

In this melting and kneading in the presence of the radical-generating agent, the substantial propylene homopolymer described above and/or the propylene resin (hereinafter referred to as a treated propylene resin) comprising the propylene copolymer composition are preferably blended with an antioxidant (B), water (C) and a neutralizing agent (D) together with the radical-generating agent (A), and the mixture is preferably molten and kneaded.

The radical-generating agent of the component (A) described above has preferably a decomposition temperature which is not too low in order to obtain a homogeneous soft polypropylene resin, and the temperature for obtaining a half value period of 10 hours is usually 70° C. or higher, preferably 100° C. or higher. Capable of being given as such compound are, for example, organic peroxides such as benzoyl peroxide, t-butyl perbenzoate, t-butyl peracetate, t-butyl peroxyisopropylcarbonate, 2,5-di-methyl-2,5-di(benzoylperoxy)hexane, 2,5-di-methyl-2,5-di(benzoylperoxy)hexyne-3, t-butyl-di-peradipate, t-butylperoxy-3,5,5-trimethoxyhexanoate, methyl-ethyl ketone peroxide, cyclohexanone peroxide, di-t-butyl peroxide, dicumyl peroxide, 2,5-di-methyl-2,5-di(t-butylperoxy)hexane, 2,5-di-methyl-2,5-di(t-butylperoxy)hexyne-3, 1,3-bis(t-butylperoxyisopropyl)benzene, t-butylcumyl peroxide, 1,1-bis(t-butylperoxy)-3,3,5-trimethylcyclohexane, 1,1-bis(t-butylperoxy)cyclohexane, 2,2-bis(t-butylperoxy)butane, p-menthane hydroperoxide, di-isopropylbenzene hydroperoxide, cumene hydroperoxide, t-butyl hydroperoxide, p-cymene hydroperoxide, 1,1,3,3-tetramethylbutyl hydroperoxide, 2,5-di-methyl-2,5-di(hydroperoxy)hexane, trimethylsilyl-cumyl peroxide, 2,5-di-methyl-2,5-bis(trimethylsilylperoxy)hexane, 2,5-di-methyl-2,5-bis(trimethylsilylperoxy)hexyne-3 and 1,3-bis(trimethylsilylperoxyisopropyl)benzene. Among them, particularly preferred are 2,5-di-methyl-2,5-di(t-butylperoxy)hexane, 2,5-di-methyl-2,5-di(t-butylperoxy)hexyne-3 and 1,3-bis(t-butylperoxyisopropyl)benzene. These radical-generating agents may be used alone or in combination of two or more kinds thereof. A use amount thereof is selected in a range of usually 0.001 to 0.5 part by weight, preferably 0.01 to 0.2 part by weight per 100 parts by weight of the treated propylene resin.

Phenol antioxidants and phosphorus antioxidants are preferred as the antioxidant of the component (B), and particularly suited is a combination of a phenol antioxidant (B-1) and a phosphorus antioxidant (B-2).

The phenol antioxidant of the component (B-1) includes, for example, 6-di-t-butyl-p-cresol, 2-t-butyl-4,6-dimethylphenol, 2,6-di-t-butyl-4-ethylphenol, 2,6-di-t-butyl-4-n-butylphenol, 2,6-diisobutyl-4-n-butylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol, 2,6-di-t-butyl-4-methoxymethylphenol, n-octadecyl-β-(4'-hydroxy-3',5'-di-t-butylphenyl)propionate, 2,6-di-t-butyl-4-methoxylphenol, 2,5-di-t-butyl-hydroquinone, 2,5-di-t-amyl-hydroquinone, 2,2'-thio-bis-(6-t-butyl-4-methylphenol), 2,2'-thio-bis-(4-octylphenol), 2,2'-thio-bis-(6-t-butyl-3-methylphenol), 4,4'-thio-bis-(6-t-butyl-2-methylphenol), 4,4'-thio-bis-(6-t-butyl-3-methylphenol), 4,4'-thio-bis-(2,6-di-t-butylphenol), 2,2'-methylene-bis-(6-t-butyl-4-methylphenol), 2,2'-methylene-bis-(6-t-butyl-4-ethylphenol), 2,2'-methylene-bis-[4-methyl-6-(α-methylcyclohexyl) -phenol], 2,2'-methylene-bis-(4-methyl-6-cyclohexylphenol), 2,2'-methylene-bis-(6-nonyl-4-methylphenol), 2,2'-methylene-bis-[6-(α-methylbenzyl)-4-nonylphenol], 2,2'-methylene-bis-[6-(α,α-dimethylbenzyl)-4-nonylphenol], 2,2'-methylene-bis-(4,6-di-t-butylphenol), 2,2'-ethylidene-bis(4,6-di-t-butylphenol), 2,2'-ethylidene-bis(6-t-butyl-4-isobutylphenol), 4,4'-methylene-bis(2,6-di-t-butylphenol), 4,4'-methylene-bis(6-t-butyl-2-methylphenol), 4,4'-butylidene-bis(6-t-butyl-2-methylphenol), 4,4'-butylidene-bis(6-t-butyl-3-methylphenol), 4,4'-butylidene-bis(2,6-di-t-butylphenol), 4,4'-butylidene-bis(3,6-di-t-butylphenol), 1,1-bis(5-t-butyl-4-hydroxy-2-methylphenyl-butane, 2,6-di(3-t-butyl-5-methyl-2-hydroxybenzyl)-4-methylphenol, calcium-bis[o-ethyl-(3,5-di-t-butyl-4-hydroxybenzyl) phosphonate], 2-t-butyl-6-(3-t-butyl-2-hydroxy-5-methylbenzyl)-4-methylphenyl acrylate, 2-t-butyl-6-[3-t-butyl-2-hydroxy-5-methyl (α-methylbenzyl) ]-4-methylphenyl acrylate, 2,4-di-t-butyl-6-[3,5-di-t-butyl-2-hydroxy (α-methylbenzyl)]

phenyl acrylate, 2,4-di-t-amyl-6-[3,5-di-t-amyl-2-hydroxy (α-methylbenzyl)]-phenyl acrylate, tocopherol, 2,6-diphenyl-4-octadecyloxyphenol, 2,4-bis(n-octylthio)-6-(4-hydroxy-3,5-di-t-butylanilino)-1,3,5-triazine, 2,4,6-tris(2'-hydroxy-4'-octoxyphenyl)-1,3,5-triazine, 2,4,6-tris[3-(3',5'-di-t-butyl-4'-hydroxyphenyl)-ethyl]-1,3,5-triazine, 2,4,6-tris (3',5'-di-t-butyl-4'-hydroxybenzylthio)-1,3,5-triazine, 1,3,5-tris(3',5'-di-t-butyl-4'-hydroxybenzylacetyl)-hexahydro-1,3,5-triazine, 1,3,5-tris(4-t-butyl-3-hydroxy-2,6-dimethylbenzyl)-1,3,5-triazine-2,4,6-(1H, 2H, 5H)trione, 1,1,3-tris(5-t-butyl-4-hydroxy-2-methylphenyl)-butane, triethylene glycol bis[3-(3-t-butyl-5-methyl-4-hydroxyphenyl) propionate], 1,6-hexanediol bis[3-(3,5-di-t-butyl-4-hydroxyphenyl)-propionate], N,N'-bis[3-(3,5-di-t-butyl-4-hydroxyphenyl)propionyl]-hexamethylenediamine, 3,5-di-t-butyl-4-hydroxybenzylphosphonate diethyl ester, 2,2-thiodiethylene-bis[3-(3,5-di-t-butyl-4-hydroxyphenyl) propionate], bis[3,3-bis(4'-hydroxy-3'-t-butylphenyl)butyric acid] ethylene glycol ester, bis[3,3-bis(4'-hydroxy-3'-methyl-5'-t-butylphenyl)-butyric acid] ethylene glycol ester, bis[3,3-bis(4'-hydroxy-3',5'-di-t-butylphenyl)butyric acid] ethylene glycol ester, bis[3,3-bis(4'-hydroxy-3'-t-butylphenyl)butyric acid] 2,2-bis(hydroxyethoxyphenyl) propane ester, bis[3,3-bis(4'-hydroxy-3'-methyl-5'-t-butylphenyl)butyric acid]-2,2-bis(hydroxyethoxyphenyl) propane ester, bis[3,3-bis(4'-hydroxy-3',5'-di-t-butylphenyl) butyric acid] 2,2-bis(hydroxyethoxyphenyl)propane ester, bis[2-(3'-t-butyl-2'-hydroxy-5'-methylbenzyl)-6-t-butyl-4-methylphenyl] terephthalate, 3,9-bis(3,5-di-t-butyl-4-hydroxyphenyl)-2,4,8,10-tetraoxaspiro[5,5]-undecane, 3,9-bis[1,1-dimethyl-2-(3,5-di-t-butyl-4-hydroxyphenyl)ethyl]-2,4,8,10-tetraoxaspiro[5,5]-undecane, 3,9-bis[1,1-dimethyl-2-{β-(3-t-butyl-4-hydroxy-5methylphenyl) propionyloxy}ethyl]-2,4,8,10-tetraozaspiro[5,5]undecane, 3,9-bis[1,1-dimethyl-2-{β-(3,5-di-t-butyl-4-hydroxyphenyl) propionyloxy}-ethyl]2,4,8,10-tetraoxaspiro[5,5]undecane, 3,9-bis[1,1-dimethyl-2-{β-(3,5-diphenyl-4-hydroxyphenyl) propionyloxy}ethyl]-2,4,8,10-tetraoxaspiro[5,5]undecane, 3,9-bis[1,1-dimethyl-2-{β-(3,5-dicyclohexyl-4-hydroxyphenyl)propionyloxy}-ethyl]-2,4,8,10-tetraoxaspiro[5,5]undecane, 1,3,5-trimethyl-2,4,6-tris(3,5-di-t-butyl-4-hydroxybenzyl)benzene, tris(3,5-di-t-butyl-4-hydroxybenzyl)isocyanurate, tris(4-t-butyl-3-hydroxy-2,6-dimethylbenzyl)isocyanurate, tris[3-(3,5-di-t-butyl-4-hydroxyphenyl)propionyloxyethyl]isocyanurate, 2,2-bis-[4-[2-(3-methyl-5-butyl-4-hydroxyphenyl-propionyloxy) ethoxy]phenyl]propane, 2,2-bis-[4-[2-(3,5-di-t-butyl-4-hydroxyphenylpropionyloxy)-ethoxy]phenyl]propane, tetrakis[methylene-3-(3'-methyl-5'-t-butyl-4'-hydroxyphenyl)propionate]methane and tetrakis[methylene-3-(3',5-di-t-butyl-4'-hydroxyphenyl)propionate]methane. These phenol antioxidants may be used alone or in combination of two or more kinds thereof.

On the other hand, the phosphorus antioxidant of the component (B-2) includes, for example, trioctyl phosphite, trilauryl phosphite, tristridecyl phosphite, trisisodecyl phosphite, phenyldiisooctyl phosphite, phenyldiisodecyl phosphite, phenyldi(tridecyl) phosphite, diphenylisooctyl phosphite, diphenylisodecyl phosphite, diphenyltridecyl phosphite, triphenyl phosphite, tris(nonylphenyl) phosphite, tris(2,4-di-t-butylphenyl) phosphite, tris(butoxyethyl) phosphite, tetratridecyl-4,4'-butylidenebis(3-methyl-6-t-butylphenol) diphosphite, 4,4'-isopropylidene-diphenolalkyl phosphite (provided that alkyl has 12 to 15 carbon atoms), 4,4'-isopropylidenebis(2-t-butylphenol).di(nonylphenyl) phosphite, tris(biphenyl) phosphite, tetra(tridecyl)-1,1,3-tris (2-methyl-5-t-butyl-4-hydroxyphenyl)butane diphosphite, tris(3,5-di-t-butyl-4-hydroxyphenyl) phosphite, hydrogenated 4,4'-isopropylidenediphenol polyphosphite, bis (octylphenyl).bis[4,4'-butylidenebis(3-methyl-6-t-butylphenol)].1,6-hexanediol diphosphite, hexatridecyl-1,1,3-tris(2-methyl-4-hydroxy-5-t-butylphenol) phosphite, tris [4,4'-isopropylidenebis(2-t-butylphenol)] phosphite, tris(1,3-distearoyloxyisopropyl) phosphite, 9,10-dihydro-9-phosphaphenanthrene-10-oxide, tetrakis(2,4-di-t-butylphenyl)-4,4'-biphenylenediphosphonate, distearylpentaerythritol diphosphite, di(nonylphenyl) pentaerythritol diphosphite, phenyl.4,4'-isopropylidenediphenol-pentaerythritol diphosphite, bis(2,4-di-t-butylphenyl)pentaerythritol diphosphite, bis(2,6-di-t-butyl-4-methylphenyl) pentaerythritol diphosphite and phenyl bisphenol-A-pentaerythritol diphosphite.

Among them, preferred are tris(2,4-di-t-butylphenyl) phosphite, tris(nonylphenyl) phosphite and tetrakis(2,4-di-t-butylphenyl)-4,4'-biphenylene diphosphonite. These phosphorus antioxidants may be used alone or in combination of two or more kinds thereof.

In the present invention, in respect to the antioxidants of the component (B), the phenol antioxidant of the component (B-1) is advantageously blended in a proportion of usually 0.01 to 1 part by weight, preferably 0.02 to 0.5 part by weight per 100 parts by weight of the treated propylene resin, and the phosphorus antioxidant of the component (B-2) is advantageously blended in a proportion of usually 0.01 to 3 parts by weight, preferably 0.05 to 2 parts by weight. If the blending amounts of the phenol antioxidant and the phosphorus antioxidant are smaller than the ranges described above, it is likely that the thermal oxidation degradation-preventing effect is not sufficiently exhibited. On the other hand, if the amounts are larger than the ranges described above, the effects thereof are not elevated in proportion to the amounts blended, and it is rather disadvantageous from an economical point of view.

Water of the component (C) is advisably blended in a proportion of usually 0.01 to 1 part by weight, preferably 0.05 to 0.5 part by weight per 100 parts by weight of the treated propylene resin. If this blending amount is less than 0.01 part by weight, it is likely that the coloring-preventing effect is not sufficiently exhibited. On the other hand, if it exceeds 1 part by weight, the effect thereof is not elevated in proportion to the amount blended, and foaming is rather notably caused. Accordingly, it is not practical.

Further, the neutralizing agent of the component (D) shall not specifically be restricted and includes conventionally known compounds, for example, hydrotalcite and calcium stearate. A blending amount of this neutralizing agent is selected in a range of usually 0.05 to 5 part by weight, preferably 0.1 to 2 parts by weight per 100 parts by weight of the treated propylene resin.

A kneading method in producing the soft polypropylene resin of the present invention shall not specifically be restricted, and various methods can be used according to the situations. A method shown below is practically used because of easiness in operation.

First, the component (A), the component (B), the component (C) and the component (D) each described above are added respectively to the substantial propylene homopolymer and/or the propylene resin comprising the propylene copolymer composition each obtained in the manner described above in the prescribed proportions, and suitably added thereto are, if necessary, various other additives which are usually added to propylene resins, to be specific, light stabilizers, transparency-providing agents, nucleating agents, lubricants, anti-static agents, anti-blocking agents, heavy metal-deactivating agents, fillers, pigments, flame retardants and mold release agents. They are compounded by means of a Henschel mixer, a super mixer, a ribbon blender, a Banbury mixer and a tumbler and mixed at such a temperature that the radical-generating agent is not decomposed. Then, this mixture is molten and kneaded at a melt-kneading temperature of 150 to 350° C., preferably 180 to 270° C. by means of various melt-kneading apparatuses such as a single shaft extruding machine, a double shaft extruding machine, a brablender and a roll, preferably a melt-kneading apparatus having a deaerating zone, and then it is pelletized, whereby the desired soft polypropylene resin of the present invention is obtained. Water may be added to the above mixture immediately before or in a melting zone of the melt-kneading apparatus.

The desired soft polypropylene resin thus obtained has to have a melt index (MI, measured at a temperature of 230° C. and a load of 21.18N) falling in a range of 1 to 10 g/10 minutes which is measured according to JIS K7210. If this MI is less than 1 g/10 minutes, the resin is inferior in fluidity in molding, so that the molding cycle is delayed, and a production efficiency of the molded article is reduced. On the other hand, if MI exceeds 10 g/10 minutes, a lot of fish eyes are produced on the molded article such as a film and a sheet. MI is suitably 1 to 7 g/10 minutes.

Further, in the soft polypropylene resin of the present invention, a melt peak temperature (Tm) measured by means of a differential scanning calorimeter (DSC) is preferably 150° C. or higher. If Tm is lower than 150° C., the sufficiently high heat resistance can not be obtained. This Tm falls usually in a range of 150 to 165° C. On the other hand, the melt enthalpy (ΔH) measured by means of DSC is preferably 100 J/g or less. If ΔH exceeds 100 J/g, the flexibility is damaged, and the object of the present invention is not achieved in a certain case. This ΔH falls usually in a range of 20 to 100 J/g, preferably 30 to 80 J/g.

Further, the tensile elastic modulus (according to JIS K7113) is preferably 800 MPa or less. It is preferably 200 MPa or less. If it is less than 200 MPa, the polymer has no problem on flexibility. However, the production stability is likely to be reduced, and a problem on productivity is likely to be caused.

The Shore hardness (D scale, according to JIS K7215) is preferably 80 or less. It is preferably 40 or more. If it is less than 40, the molded article is liable to be scratched on a surface thereof.

Next, the present invention shall more specifically be explained with reference to examples, but the present invention shall by no means be restricted by these examples.

The physical properties of the soft polypropylene resins obtained in the respective examples were determined by methods shown below.

(1) Met Index (MI)

Measured on the conditions of a temperature of 230° C. and a load of 21.18N according to JIS K7210.

(2) Melting Point (Tm) and (3) Melt Enthalpy (ΔH)

The melting point and the melt enthalpy were determined by DSC measurement. That is, a differential scanning calorimeter (DSC-7, manufactured by Perkin Elmer Co., Ltd.) was used to melt 10 mg of a sample at 230° C. for 3 minutes under nitrogen atmosphere, and then the temperature was lowered down to 0° C. at a rate of 10° C./minute and maintained the temperature at 0° C. for 3 minutes. Further, the temperature was elevated at a rate of 10° C./minute to obtain a melt endothermic curve, wherein a peak top in a maximum peak in the melt endothermic curve was designated as the melting point (Tm), and a melt endothermic amount was designated as the melt enthalpy (ΔH) (J/g)

(4) Tensile Elastic Modulus

Measured by a tensile test using a No. 2 dumbbell according to JIS K7113.

(5) Shore Hardness (D Scale)

Measured according to JIS K7215

EXAMPLE 1

(1) Preparation of Magnesium Compound

A stainless steel-made catalyst reactor was sufficiently substituted with nitrogen gas and then charged with 25 kg of ethanol (moisture content: 100 ppm), 1.6 g of iodine and 16 kg of metallic magnesium, and they were reacted under a heating condition while stirring until hydrogen gas was not observed to be generated from the system under a refluxing condition to obtain a solid reaction product. The reaction solution containing this solid reaction product was dried under reduced pressure to obtain a magnesium compound.

(2) Preparation of Solid Catalyst Component

A stainless steel-made catalyst reactor having a content volume of 500 liter which was sufficiently substituted with nitrogen gas was charged with 16 kg of the magnesium compound obtained in (1) described above, 80 liter of refined heptane, 2.4 liter of silicon tetrachloride and 2.3 liter of diethyl phthalate. Titanium tetrachloride 77 liter was added thereto while maintaining the system at 90° C. and stirring to carry out reaction at 110° C. for 2 hours, and then the solid component was separated and washed with refined heptane of 80° C. Further, 122 liter of titanium tetrachloride was added thereto to carry out reaction at 110° C. for 2 hours, and then the solid matter was sufficiently washed with refined heptane to obtain a solid catalyst component.

(3) Pre-Polymerization

A stainless steel-made polymerization reactor having a content volume of 80 liter which was sufficiently substituted with nitrogen gas was charged with 4 kg of the solid catalyst component obtained in (2) described above, 40 liter of refined heptane, 1.6 mole of triethylaluminum and 0.4 mole of cyclohexylmethyldimethoxysilane, and then propylene was continuously fed for 2 hours while maintaining the system at 40° C. and stirring to carry out pre-polymerization almost at an atmospheric pressure. After stopping feeding propylene, the system was maintained at a temperature of 40° C. for 30 minutes. Then, the solid matter was washed with refined heptane to obtain a pre-polymerization catalyst.

(4) Polymerization

A continuous production apparatus was fed with 1.30 kg/hr of the pre-polymerization catalyst obtained in (3) described above and charged with 52 mole of triisobutylaluminum, 8 mole of cyclohexylmethyldimethoxysilane and 1.6 mole of 1-allyl-3,4-dimethoxybenzene each per mole of a titanium atom contained in the above pre-polymerization catalyst, and further a propylene monomer was fed to carry out continuous gas phase polymerization at a temperature of 70° C., a pressure of 2.8 MPa.G and an average residence time of one hour, whereby a propylene homopolymer was obtained.

This propylene homopolymer had a boiling n-heptane-insoluble matter content of 88% by weight and a intrinsic viscosity [η] of 4.8 deciliter/g which was measured at 135° C. in tetralin.

(5) Dissolution and Pelletization

Added to 100 parts by weight of the propylene homopolymer obtained in (4) described above were 0.02 part by weight of 1,3,5-tris(4-t-butyl-3-hydroxy-2,6-dimethylbenzyl)-1,3,5triazine-2,4,6-(1H, 2H, 5H)trione, 0.05 part by weight of tetrakis(2,4-di-t-butylphenyl)-4,4'- biphenylene phosphinate, 0.05 part by weight of tris(2,4-di-t-butylphenyl) phosphite, 0.075 part by weight of $Mg_{4.5}Al_2(OH)_{13}CO_3.3.5H_2O$, 0.075 part by weight of calcium stearate and 0.017 part by weight of 1,3-bis(t-butylperoxyisopropyl)benzene, and then 0.35 part by weight of water was further added thereto. The mixture was molten and kneaded so that the resin temperature was 220° C. and then pelletized to obtain a pelletized soft polypropylene resin. The physical properties of this resin are shown in Table 1.

EXAMPLE 2

A soft polypropylene resin was obtained in the same manner as in Example 1(5), except that an addition amount of 1,3-bis(t-butylperoxyisopropyl)-benzene was changed from 0.017 part by weight to 0.014 part by weight in Example 1 (5). The physical properties of this resin are shown in Table 1.

Comparative Example 1

The same operations as in Example 1 (1) to (3) were carried out to obtain a pre-polymerization catalyst. Next, propylene was fed to be polymerized in the same manner as in Example 1 (4), except that hydrogen was introduced at a rate of 50 liter/hr in polymerization in Example 1 (4), but clogging of the pipelines and stirring fluctuation were heavy, and operation was impossible, so that a soft polypropylene resin could not be obtained.

EXAMPLE 3

A soft polypropylene resin was obtained in the same manner as in Example 1, except that in Example 1 (4), a propylene monomer was homopolymerized in the reaction of the first stage, and then propylene was random-copolymerized with ethylene in the reaction of the second stage to obtain a propylene block copolymer.

In the operation described above, two reactors were used to produce the propylene-ethylene block copolymer. A propylene homopolymer discharged from the reactor of the first stage was deaerated before introduced into the reactor of the second stage and then introduced into the reactor of the second stage which was controlled to 50° C. A monomer gas having a composition ratio of ethylene/propylene=2/5 (mole ratio) was introduced into the reactor of the second stage to copolymerize ethylene and propylene at a pressure of 1.5 MPa·G, a temperature of 50° C. and an average residence time of one hour.

The propylene-ethylene block copolymer thus obtained was dissolved and pelletized in the same manner as in Example 1 (5) to obtain a soft polypropylene resin. The physical properties of this resin are shown in Table 1.

In the propylene-ethylene block copolymer described above, a homogeneous part comprising the propylene homopolymer had a content of 62% by weight, and a copolymerization part comprising the propylene-ethylene random copolymer had a content of 38% by weight. The homogeneous part had a boiling n-heptane-insoluble matter content of 68% by weight and a intrinsic viscosity [η] of 4.2 deciliter/g which was measured at 135° C. in tetralin. On the other hand, the copolymerization part had an ethylene unit content of 37.6% by weight. Further, this the propylene block copolymer had a intrinsic viscosity [η] of 4.3 deciliter/g which was measured at 135° C. in tetralin.

TABLE 1

|  | Example | | |
| --- | --- | --- | --- |
|  | 1 | 2 | 3 |
| Melt index [MI] (g/10 minutes) | 2.6 | 1.6 | 2.3 |
| Melting point [Tm] (° C.) | 161.3 | 156.4 | 158.4 |
| Melt enthalpy [ΔH] (J/g) | 75.6 | 74.4 | 43.9 |
| Tensile elastic modulus (MPa) | 773 | 662 | 241 |
| Shore hardness (D scale) | 69 | 69 | 49 |

INDUSTRIAL APPLICABILITY

According to the present invention, a substantial propylene homopolymer or a propylene copolymer composition each having specific properties is molten and kneaded in the presence of a radical-generating agent, whereby capable of being obtained is a soft polypropylene resin which is useful as an alternative for a polyvinyl chloride resin in the fields of films, sheets, construction materials and the like and which is excellent in fluidity.

What is claimed is:

1. A soft polypropylene resin having a melt index at a temperature of 230° C. and a load of 21.18N of 1 to 10 g/10 minutes, obtained by melting and kneading, in the presence of a radical-generating agent, a propylene resin composition comprising a substantial propylene homopolymer having a boiling n-heptane-insoluble matter content of 60 to 90% by weight and an intrinsic viscosity of 3 to 6 deciliter/g measured at 135° C. in tetralin.

2. A soft polypropylene resin having a melt index at a temperature of 230° C. and a load of 21.18N of 1 to 10 g/10 minutes, obtained by melting and kneading, in the presence of a radical-generating agent, a propylene resin composition comprising a propylene copolymer composition comprising 10 to 95% by weight of a homogeneous part comprising a substantial propylene homopolymer and 90 to 5% by weight of a copolymerization part comprising a propylene-ethylene random copolymer, herein the homogeneous part has a boiling n-heptane-insoluble matter content of 60 to 90% by weight and a intrinsic viscosity of 3 to 6 deciliter/g measured at 135° C. in tetralin; the copolymerization part comprises 10 to 60% by weight of ethylene; and the propylene resin composition has an a intrinsic viscosity of 3 to 6 deciliter/g measured at 135° C. tetralin.

3. The soft polypropylene resin as described in claim 1, wherein the propylene resin composition is first blended with a radical-generating agent (A), an antioxidant (B), water (C) and a neutralizing agent (D) to form a blended mixture, and the blended mixture is melted and kneaded at a temperature of 150 to 350° C.

4. The soft polypropylene resin as described in claim 3, wherein the antioxidant of the component (B) comprises a phenol antioxidant (B-1) and a phosphorus antioxidant (B-2).

5. The soft polypropylene resin as described in claim 4, obtained by blending 100 parts by weight of the propylene resin with 0.001 to 0.5 part by weight of the component (A), 0.01 to 1 part by weight of the component (B-1), 0.01 to 3 parts by weight of the component (B-2), 0.01 to 1 part by weight of the component (C) and 0.05 to 5 parts by weight of the component (D) to form the blended mixture, and melting and kneading the blended mixture.

6. The soft polypropylene resin as described in claim 2, wherein the propylene resin composition is first blended with a radical-generating agent (A), an antioxidant (B), water (C) and a neutralizing agent (D), to form a blended mixture and the blended mixture is melted and kneaded at a temperature of 150 to 350° C.

7. A soft polypropylene resin having a melt index at a temperature of 230° C. and a load of 21.18N of 1 to 10 g/10 minutes, obtained by melting and kneading, in the presence of a radical-generating agent, a propylene resin composition comprising a substantial propylene homopolymer having a boiling n-heptane-insoluble matter content of 60 to 90% by weight and an intrinsic viscosity of 3 to 6 deciliter/g measured at 135° C. in tetralin, wherein the propylene homopolymer is obtained by homopolymerizing propylene in the absence of hydrogen and in the presence of a catalyst comprising solid catalyst comprising magnesium, titanium, a halogen and an electron donating substance; triisobutyl aluminum; and an alkoxy group-containing aromatic compound.

8. The soft polypropylene resin as described in claim 7, wherein the propylene resin composition is first blended with a radical-generating agent (A), an antioxidant (B), water (C) and a neutralizing agent (D), to form a blended mixture and the blended mixture is melted and kneaded at a temperature of 150 to 350° C.

9. The soft polypropylene resin as described in claim 8, wherein the antioxidant of the component (B) comprises a phenol antioxidant (B-1) and a phosphorus antioxidant (B-2).

10. The soft polypropylene resin as described in claim 8, obtained by blending 100 parts by weight of the propylene resin with 0.001 to 0.5 part by weight of the component (A), 0.01 to 1 part by weight of the component (B-1), 0.01 to 3 parts by weight of the component (B-2), 0.01 to 1 part by weight of the component (C) and 0.05 to 5 parts by weight of the component (D) to form a blended mixture, and melting and kneading the blended mixture.

11. A soft polypropylene resin having a melt index at a temperature of 230° C. and a load of 21.18N of 1 to 10 g/10 minutes, obtained by melting and kneading, in the presence of a radical-generating agent, a propylene resin composition comprising a propylene copolymer composition comprising 10 to 95% by weight of a homogeneous part comprising a substantial propylene homopolymer and 90 to 5% by weight of a copolymerization part comprising a propylene-ethylene random copolymer, wherein the homogeneous part has a boiling n-heptane-insoluble matter content of 60 to 90% by weight and a intrinsic viscosity of 3 to 6 deciliter/g measured at 135° C. in tetralin; the copolymerization part comprises 10 to 60% by weight of ethylene unit; and the propylene copolymer composition has an intrinsic viscosity of 3 to 6 deciliter/g measured at 135° C. in tetralin, wherein the propylene copolymer is obtained by copolymerizing ethylene and propylene in the absence of hydrogen and in the presence of a catalyst system comprising a solid catalyst comprising magnesium, titanium, a halogen and an electron donating substance; triisobutyl aluminum; and an alkoxy group-containing aromatic compound.

12. The soft polypropylene resin as described in claim 11, wherein the propylene resin composition is first blended with a radical-generating agent (A), an antioxidant (B), water (C) and a neutralizing agent (D), to form a blended mixture and the blended mixture is melted and kneaded at a temperature of 150 to 350° C.

13. The soft polypropylene resin as described in claim 12, wherein the antioxidant of the component (B) comprises a phenol antioxidant (B-1) and a phosphorus antioxidant (B-2).

14. The soft polypropylene resin as described in claim 13, obtained by blending 100 parts by weight of the propylene resin with 0.001 to 0.5 part by weight of the component (A), 0.01 to 1 part by weight of the component (B-1), 0.01 to 3 parts by weight of the component (B-2), 0.01 to 1 part by weight of the component (C) and 0.05 to 5 parts by weight of the component (D) to form the blended mixture, and melting and kneading the blended mixture.

15. A soft polypropylene resin having a melt index at a temperature of 230° C. and a load of 21.18N of 1 to 10 g/10 minutes, obtained by melting and kneading, in the presence of a radical-generating agent, a propylene resin composition comprising a substantial propylene homopolymer having a boiling n-heptane-insoluble matter content of 60 to 90% by weight and an intrinsic viscosity of 3 to 6 deciliter/g measured at 135° C. in tetralin, wherein the propylene homopolymer is obtained by homopolymerizing propylene in the absence of hydrogen and in the presence of a catalyst system comprising a solid catalyst comprising magnesium, titanium, a halogen and an electron donating substance; triisobutyl aluminum; and an alkoxy group-containing aromatic compound; wherein the catalyst system comprises a composition obtained by prepolymerizing propylene in the presence of the solid catalyst and an organic aluminum compound.

16. The soft polypropylene resin of claim 15, wherein the solid catalyst is prepolymerized before the propylene is homopolymerized.

17. The soft polypropylene resin of claim 15, wherein the catalyst system is obtained by prepolymerizing propylene in the presence of the solid catalyst, an organic aluminum compound and an electron donating compound.

18. A soft polypropylene resin having a melt index at a temperature of 230° C. and a load of 21.18N of 1 to 10 g/10 minutes, obtained by melting and kneading, in the presence of a radical-generating agent, a propylene resin composition comprising a propylene copolymer composition comprising 10 to 95% by weight of a homogeneous part comprising a substantial propylene homopolymer and 90 to 5% by weight of a copolymerization part comprising a propylene-ethylene random copolymer, wherein the homogeneous part has a boiling n-heptane-insoluble matter content of 60 to 90% by weight and an intrinsic viscosity of 3 to 6 deciliter/g measured at 135° C. in tetralin; the copolymerization part comprises 10 to 60% by weight of ethylene units; and the propylene copolymer composition has an intrinsic viscosity of 3 to 6 deciliter/g measured at 135° C. in tetralin, wherein the propylene copolymer is obtained by copolymerizing ethylene and propylene in the absence of hydrogen and in the presence of a catalyst system comprising a solid catalyst comprising magnesium, titanium, a halogen and an electron donating substance; triisobutyl aluminum; and an alkoxy group-containing aromatic compound; wherein the catalyst system is obtained by prepolymerizing propylene in the presence of the solid catalyst and an organic aluminum compound.

19. The soft polypropylene resin of claim 18, wherein the catalyst system is obtained by prepolymerizing propylene in the presence of the solid catalyst, an organic aluminum compound and an electron donating compound.

20. The soft polypropylene resin of claim 18, wherein the prepolymerization of the catalyst system with propylene is carried out before the propylene is copolymerized with ethylene.

* * * * *